United States Patent [19]
Hutter, III et al.

[11] Patent Number: 5,704,747
[45] Date of Patent: Jan. 6, 1998

[54] ADHESIVE BONDED NUTPLATE ASSEMBLY WITH INTEGRAL LINER SLEEVE

[75] Inventors: Charles G. Hutter, III; Kenneth M. Brown, both of Carson City, Nev.

[73] Assignee: Physical Systems, Inc. a Nevada corp., Carson City, Nev.

[21] Appl. No.: 680,937

[22] Filed: Jul. 16, 1996

[51] Int. Cl.⁶ .................. F16B 13/06; F16B 39/28
[52] U.S. Cl. .................. 411/70; 411/82; 411/113; 411/258
[58] Field of Search .................. 411/43, 69, 70, 411/82, 111–113, 258, 183, 930

[56] References Cited

U.S. PATENT DOCUMENTS

| | | | |
|---|---|---|---|
| 4,010,519 | 3/1977 | Worthing | 411/258 |
| 4,295,766 | 10/1981 | Shaw | 411/113 |
| 4,447,944 | 5/1984 | Mohrman | 411/70 X |
| 4,830,557 | 5/1989 | Harris et al. | 411/113 |
| 5,013,391 | 5/1991 | Hutter, III et al. | |

*Primary Examiner*—Neill R. Wilson
*Attorney, Agent, or Firm*—Kelly Bauersfeld; Lowry & Kelley

[57] ABSTRACT

An adhesive bonded nutplate assembly is provided for mounting onto a substrate, particularly such as a composite substrate having an opening therein for passage of a fastener such as a bolt or screw. The nutplate assembly includes an integral liner sleeve to project through the substrate opening when the nutplate assembly is mounted thereon. An installation tool includes a tapered nose in combination with a pulling mandrel to pull and separate a fixture pin from the nutplate assembly while flaring a leading edge of the liner sleeve to lock the nutplate assembly in place.

13 Claims, 4 Drawing Sheets

ADHESIVE BONDED NUTPLATE ASSEMBLY WITH INTEGRAL LINER SLEEVE

BACKGROUND OF THE INVENTION

This invention relates generally to improvements in adhesive bonded nutplate assemblies for mounting a nut element or the like on one side of a substrate in general alignment with a substrate opening. More particularly, this invention relates to an improved nutplate assembly of the general type described in U.S. Pat. No. 5,013,391, but wherein the nutplate assembly additionally includes a liner sleeve for protecting the edges of the substrate opening against damage. The improved nutplate assembly is especially suited for adhesive mounting onto composite material substrates.

In many manufacturing environments, it is necessary or desirable to install components onto the blind side of a supporting substrate. As one common example, nutplates are well-known in the automotive and aerospace industries for use in mounting a threaded nut onto the blind side of a supporting substrate, typically in alignment with an access opening formed in the substrate, to accommodate subsequent reception of a threaded screw or bolt. Such nutplates include a floating or fixed nut element carried by a base which is fastened to the substrate normally by one or more rivets extending through rivet ports formed adjacent the access opening. Alternatively, adhesive mounting techniques have been proposed for adhesively bonding the nutplate based onto the substrate, thereby avoiding the need to form additional rivet ports. For optimum bond strength, such adhesive mounting techniques require the nutplate to be pressed against the substrate with a positive force during curing of the adhesive material. U.S. Pat. No. 5,013,391, which is incorporated by reference herein, discloses an adhesive mounted nutplate assembly and related mounting fixture for quickly and easily installing the nutplate assembly onto the substrate blind side, and for thereafter removing the fixture from the front side of the substrate.

In some applications, the nutplate assembly is desirably installed onto a substrate made from a composite material, such as graphite/epoxy resin. In such composite material substrates, it is necessary or desirable to safeguard against wear or other damage to the edges of the opening formed in the substrate. One prior approach to resolve this problem has been to install a thin-walled stainless steel liner sleeve into the substrate opening, prior to installation of the nut plate assembly. Such liner sleeve has typically been anchored in place by the use of rivets extending through a radial flange or the liner sleeve and through rivet ports formed adjacent the substrate opening. The requirement for additional rivet ports or openings in the composite substrate is not desirable, especially in applications wherein these ports and openings must be sealed. Moreover, when a rivet-installed liner sleeve is used, the nutplate assembly must be mounted in turn onto the liner sleeve flange, whereby the nutplate assembly does not seat firmly or securely upon the blind side of the substrate.

The present invention is directed to an improved nutplate assembly which incorporates a liner sleeve adapted to fit through and protect the opening in a substrate, in a manner compatible with the structure and method disclosed in U.S. Pat. No. 5,013,391. Accordingly, the present invention provides a structure and method for installing a protective liner sleeve without requiring separate riveted connection, and in a manner which permits the nutplate assembly to be adhesively mounted securely and firmly to the substrate.

SUMMARY OF THE INVENTION

In accordance with the invention, an improved adhesive bonded nutplate assembly and related fixturing method are provided for mounting the nutplate assembly onto the blind side of a substrate, wherein the nutplate assembly includes a liner sleeve for protecting the edges of a substrate opening against damage.

The nutplate assembly comprises a floating nut element retained within a housing or dome having an outer rim for adhesive mounting onto the blind side of the substrate. The liner sleeve protrudes coaxially from the nut element and retainer housing, with a radially enlarged flange secured to the retainer housing as by a press-fit connection. A fixture pin of stainless steel or the like has a contoured head at a trailing end thereof frictionally retained within the bore of the liner sleeve, and a narrow mandrel protruding through the liner sleeve beyond the forward or leading end thereof.

The nutplate assembly is installed onto the blind side of the substrate, with the liner sleeve fitting through the substrate opening with relatively close tolerance. The outer rim of the retainer housing and the flange on the liner sleeve are adhesively bonded onto the blind side of the substrate, by use of a suitable adhesive bonding material. An installation tool is provided to pull and remove the fixture pin from the front side of the substrate, and concurrently to deform or flare the leading end of the liner sleeve for mechanical interlock connection to the substrate. A preferred installation tool includes a set of mandrel jaws to grasp and pull the fixture pin, in combination with a tool nose of generally conical shape for flaring the leading end of the liner sleeve to fit, for example within a matingly shaped countersink formed on the front side of the substrate.

The deformed liner sleeve is thus tightly and securely locked to the substrate, to hold the retainer housing with the floating nut element therein on the blind side of the substrate in alignment with the substrate opening. The fixture pin may be separated from the nutplate assembly prior to curing of the bonding material, in which case the deformation of the liner sleeve functions to lock the sleeve flange and retainer housing rim tightly against the substrate during the cure period. Alternately, the liner sleeve may be sized to frictionally engage the edges of the substrate opening during the cure period, in which case the fixture pin can be removed after the adhesive material cures.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
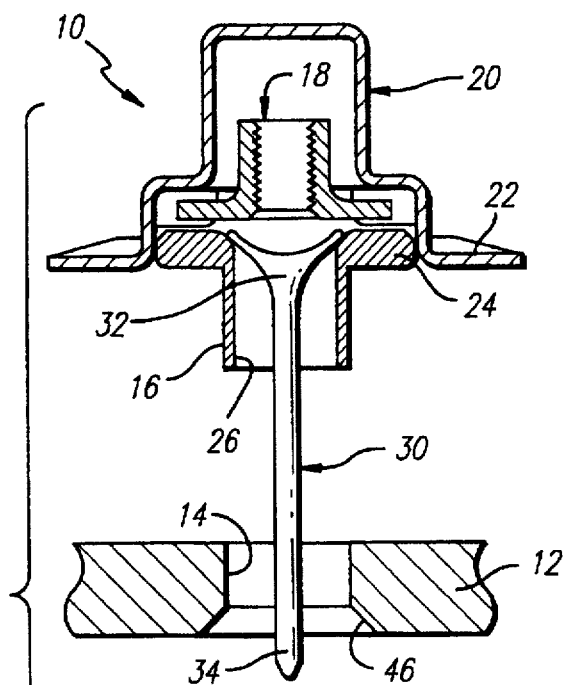
FIG. 1 is an exploded and somewhat schematic perspective view illustrating an improved adhesive bonded nutplate assembly and related liner sleeve embodying the novel features of the invention.

The new nutplate assembly is referred to generally in FIGS. 1–6 by the reference numeral 10 and is adapted for mounting by adhesive bonding onto a substrate 12 having an opening 14 formed therein. The nutplate assembly 10 includes a liner sleeve 16 is an integral part thereof, wherein the liner sleeve 16 functions upon installation to line and protect the substrate opening 14 against damage. When installed, a forward or leading end of the liner sleeve 16 is adapted for mechanical deformation as by flaring to achieve a secure mechanical interlock with the substrate 12. The nutplate assembly 10 with integral liner sleeve 16 is particularly suited for mounting onto the blind side of a composite material substrate, with the liner sleeve 16 safeguarding the edges of the substrate opening 14 against damage.

FIG. 1 shows the nutplate assembly 10 to include a floating nut element 18 captured or retained against substantial rotation within a retainer housing or dome 20 having a radially outwardly extending rim 22 for adhesive mounting onto the blind side of the substrate 12. A leading or forward end of the retainer housing 20, circumscribed by the rim 22, is open to permit reception as by press-fitting of a radially outwardly extending flange 24 on the trailing end of the liner sleeve 16. The sleeve flange 24 thus cooperates with the retainer housing 20 to receive and retain the floating nut element 18, with a sleeve, bore 26 being generally coaxially aligned with a threaded bore 28 of the nut element 18. Alternately, the sleeve flange 24 can be secured to the open end of the retainer housing 20 by other means, such as by an adhesive connection.

The liner sleeve 16 protrudes forwardly from the flange 24. In this regard, in the preferred form, the forwardmost surfaces of the sleeve flange 24 and the housing rim 22 lie in a common plane. A fixture pin 30 of stainless steel or the like has an enlarged contoured head 32 at the trailing end thereof, wherein the pin, head 32 is frictionally retained within the bore 26 of the liner sleeve 16. A narrow mandrel 34 projects with clearance from the pin head 32 and through the liner sleeve 16, terminating at a location spaced forwardly of the leading end of the liner sleeve.

Figure 2:
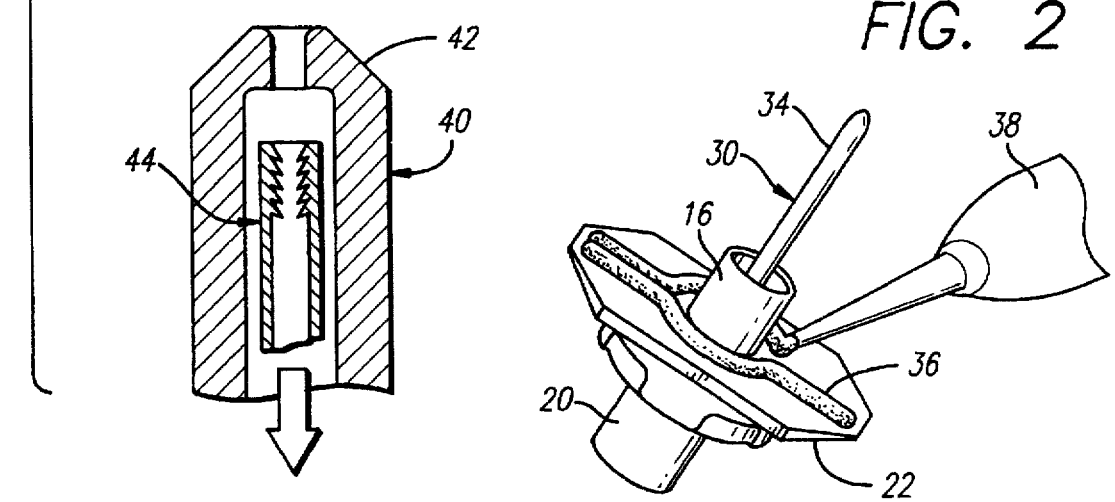
FIG. 2 is a perspective view illustrating the application of adhesive material to the nutplate assembly.
Figure 3:
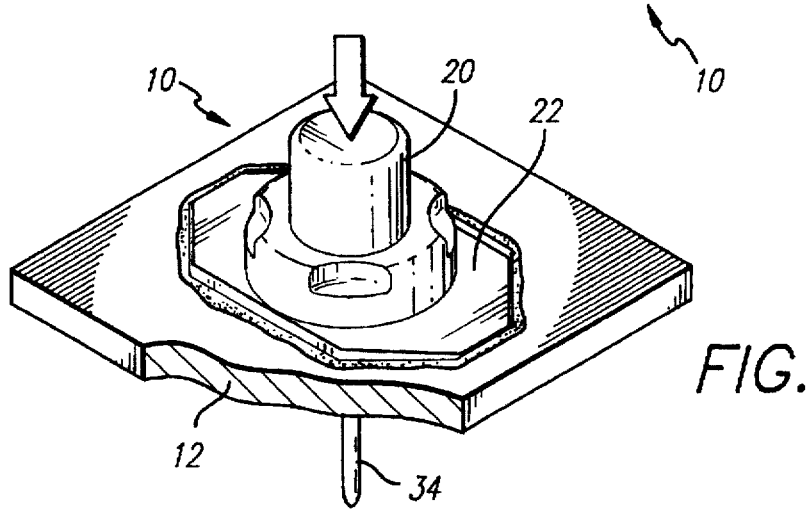
FIG. 3 is a fragmented perspective view illustrating initial placement of the nutplate assembly onto the blind side of a selected substrate.

As shown in FIG. 2, a selected adhesive material 36 is applied from an applicator 38 onto the coplanar surfaces of the liner sleeve flange 24 and the housing rim 22. The adhesive material 36 thus surrounds the liner sleeve 16 which protrudes outwardly from the adhesive bead. The nutplate assembly 10, with adhesive material thereon, is then pressed firmly against the blind side of the substrate 12 (FIG. 3), with the liner sleeve 16 and fixture pin mandrel 34 fitting through the substrate opening 14.

An installation tool 40 as shown in FIGS. 1 and 4–6 is provided for securely mounting the nutplate assembly in a tightly clamped, mechanically interlocked relation with the substrate 12. The installation tool 40 comprises a pull-type blind rivet installation tool having a modified nose piece 42 to deform or flare a leading end of the liner sleeve 16. At the same time, the installation tool utilizes pulling jaws 44 to grasp and separate the fixture pin 30 from the nutplate assembly. In the preferred form, the nose piece 42 has a truncated conical shape as shown, for deforming the leading end of the liner sleeve with a flare for seated mating fit within a countersink 46 formed in the front side of the substrate 12. One preferred installation tool 40 comprises Model G750 available from Cherry Aerospace Fastening Systems, division of Textron, Inc., of Santa Ana, Calif.

Figure 4:
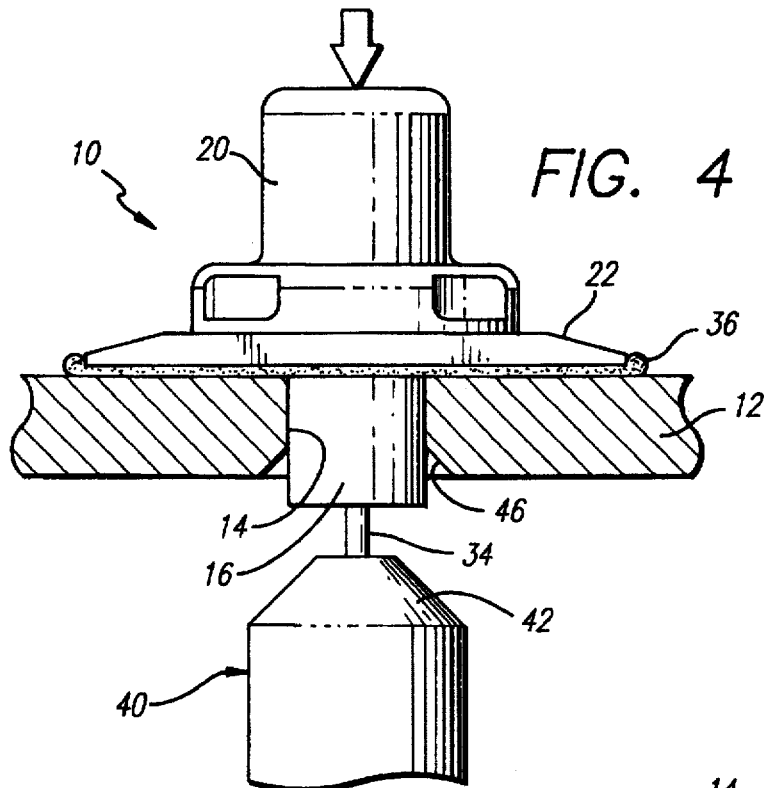
FIG. 4 is a fragmented vertical sectional view depicting initial engagement of an installation tool with a fixture pin projecting from the nutplate assembly.
Figure 5:
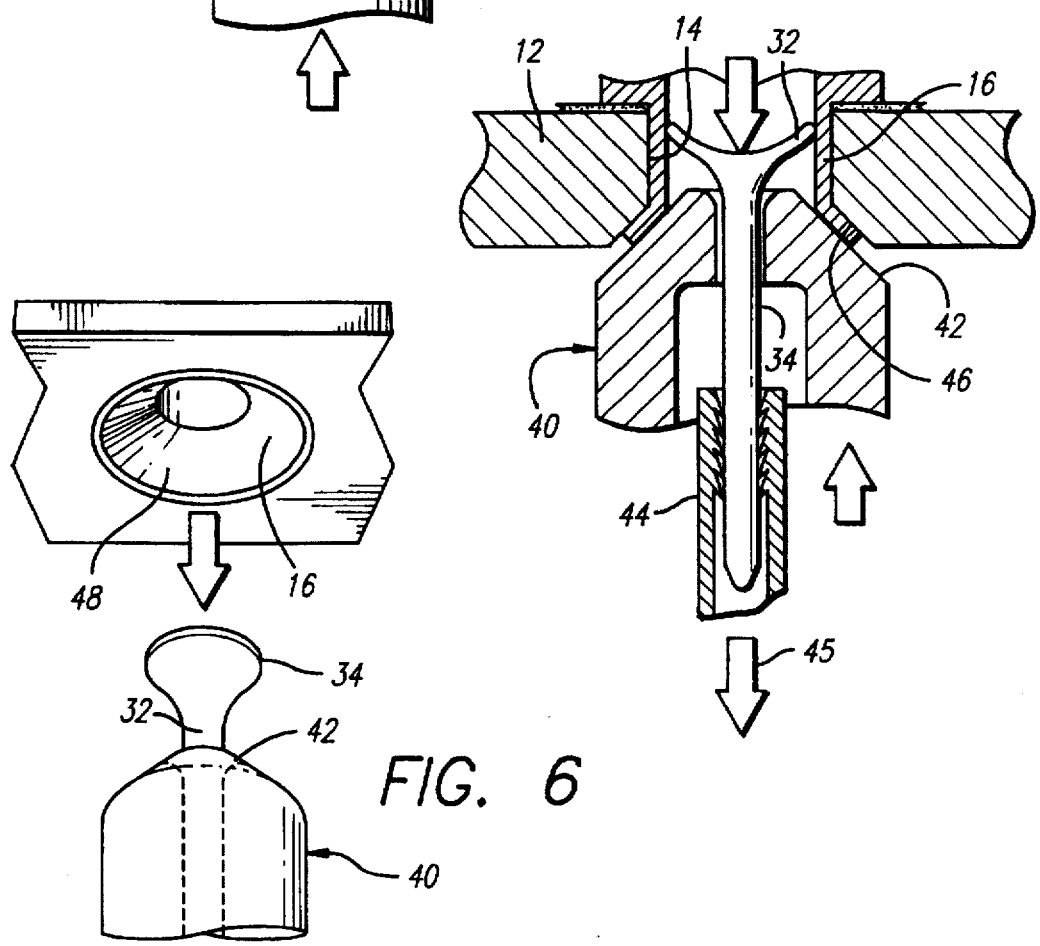
FIG. 5 is an enlarged fragmented vertical sectional view similar to a portion of FIG. 4, and depicting operation of the installation tool to pull the fixture pin and deform a leading end of the liner sleeve.
Figure 6:
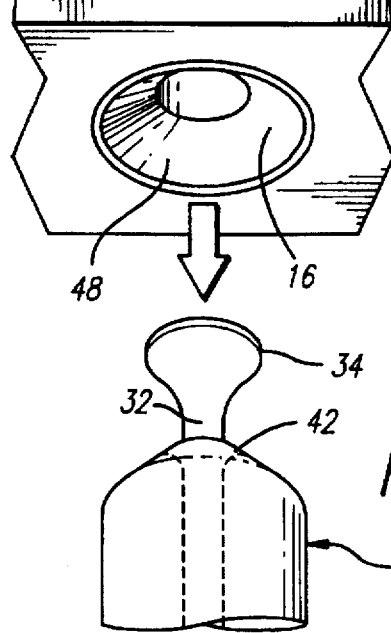
FIG. 6 is an exploded perspective view showing separation of the installation tool and fixture pin from the installed nutplate assembly.

FIG. 4 illustrates initial engagement of the installation tool 40 with the mandrel 34 of the fixture pin 30. Further engagement is depicted in FIG. 5, which shows retraction of the pulling jaws 44 in the direction of arrows 45 accompanied by relative advancement of the nose piece 42 for substantially simultaneous deformation and flaring of the liner sleeve leading end as the fixture pin is separated from the nutplate assembly. FIG. 6 shows removal of the fixture pin 30 with the installation tool 40, leaving the flared leading end 48 of the liner sleeve seated within the countersink 46.

In use, when installed as described, the liner sleeve 16 forms a convenient structure to keep the adhesive material from squeezing into the interior of the substrate opening 14. Moreover, friction between the liner sleeve and the edges of the opening 14 can assist in retaining the nutplate assembly in position while the adhesive material cures, if it is desired to defer the flaring operation to a later time. Normally, however, it is desirable to perform the flaring operation immediately after application of the adhesive material, so that the flared leading end 48 securely locks the nutplate assembly in place during the adhesive cure time.

Figure 11:
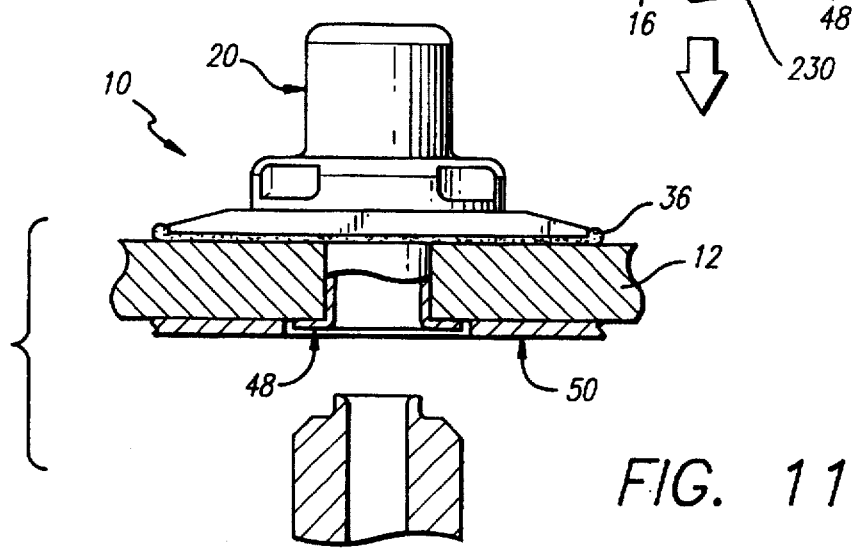
FIG. 11 is a fragmented vertical sectional view illustrating another alternative mounting arrangement for the nutplate assembly with integral liner sleeve.

The countersink 46 on the front side of the substrate 12 conveniently permits liner sleeve flaring with a final flush mounting. However, alternate nose piece configurations can be provided on the installation tool 40 to achieve alternative deformation geometries for the leading end 48 of the liner sleeve. In this regard, FIG. 11 shows the sleeve leading end 48 as a rolled or flat flare in the absence of a substrate countersink, in applications wherein a flush mounting is not required. Such applications may include, for example, the case where an elastomeric gasket 50 is interposed between the front side of the substrate 12 and a bolt or other fastener (not shown) to be secured to the nut element. This latter configuration saves the cost of providing countersinks in the substrate, and can permit the use of substrates which otherwise would not be thick enough to form a countersink therein.

Figure 7:
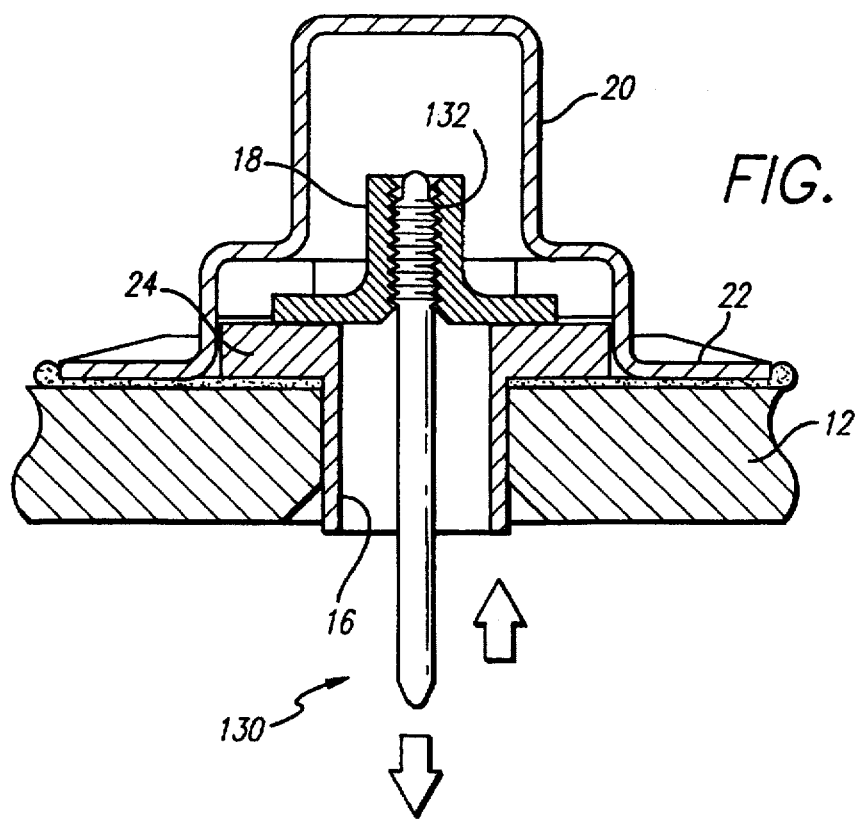
FIGS. 7 and 8 are fragmented vertical sectional views similar to FIG. 5, and illustrating an alternative preferred form of the invention.
Figure 8:
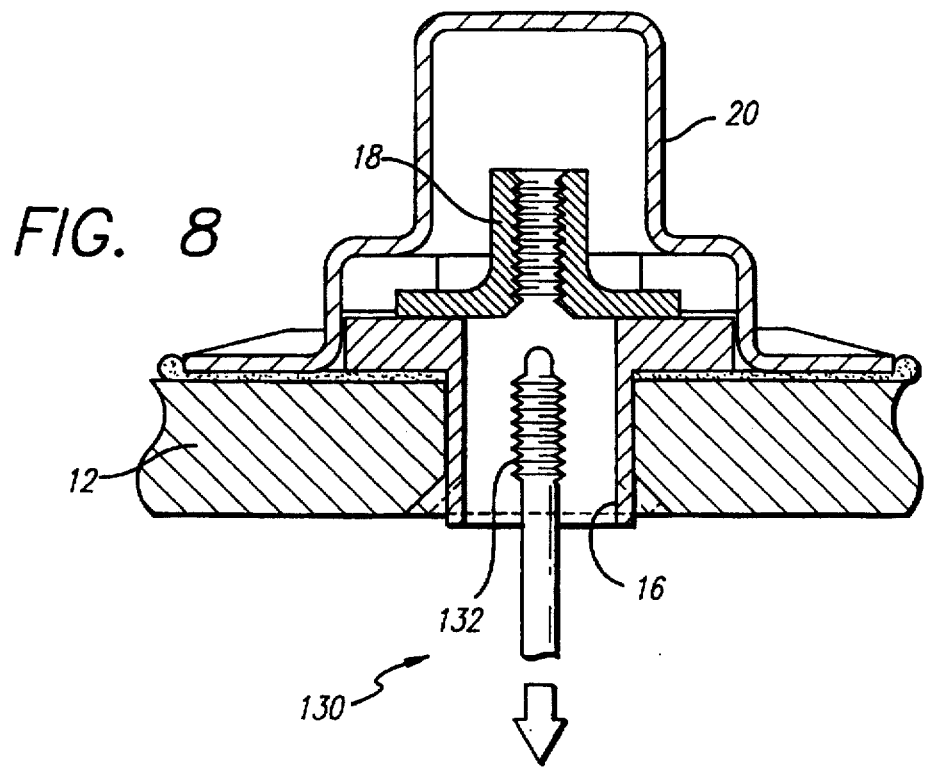

FIGS. 7 and 8 shown an alternative embodiment of the invention, modified with respect to the manner in which the fixture pin is initially connected to the nutplate assembly. In this embodiment, a modified fixture pin 130 has a threaded trailing end 132 for threaded engagement with the nut element 18. The fixture pin 130 is subsequently separated from the nutplate assembly as viewed in FIG. 8 by rotatably unthreading from the nut element, as the leading end 48 of the liner sleeve is flared or otherwise deformed.

Figure 9:
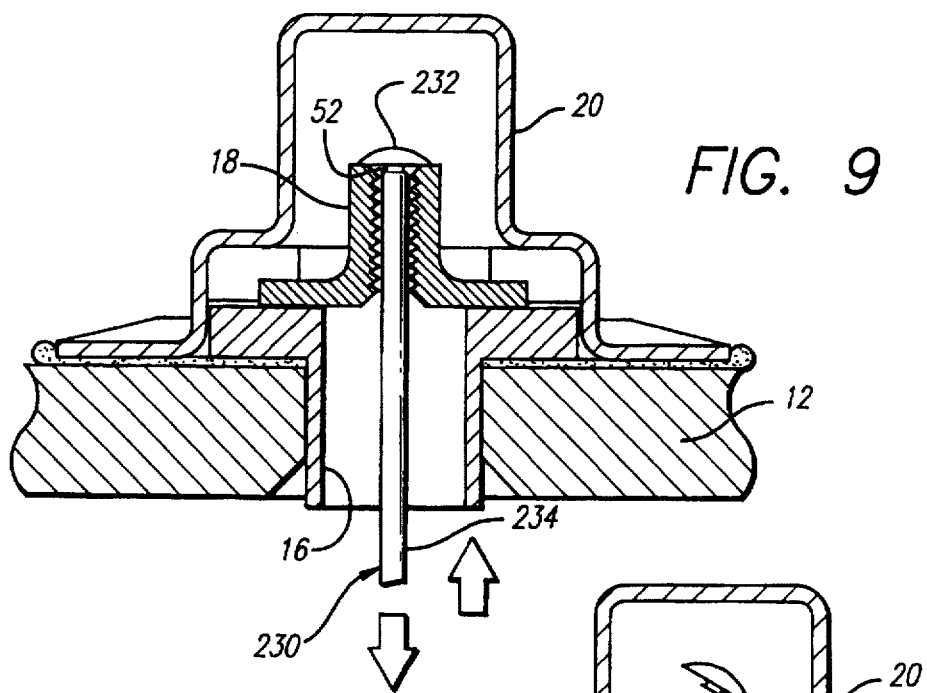
FIGS. 9 and 10 are fragmented vertical sectional views similar to FIG. 5, and depicting a further alternative preferred form of the invention.
Figure 10:
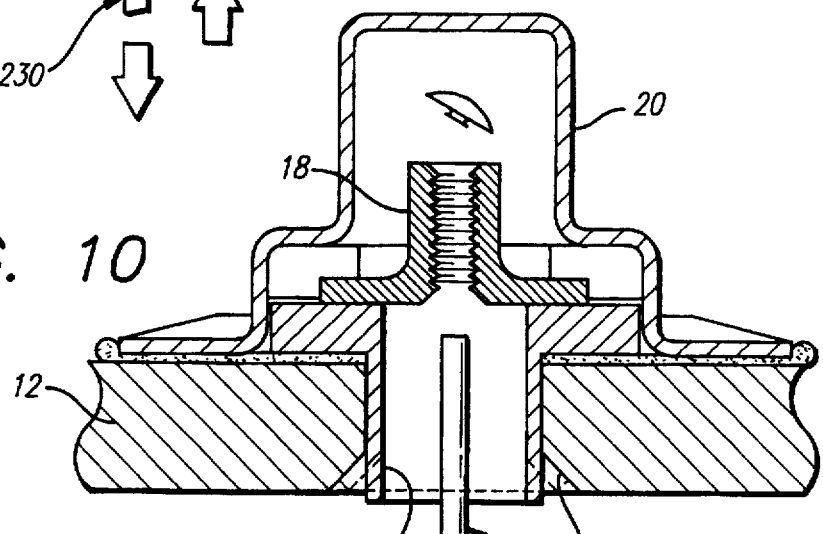

FIGS. 9 and 10 show another alternative fixture pin configuration wherein a modified fixture pin 230 has an enlarged head 232 at the trailing end thereof. In this embodiment, the pin head 232 is structurally connected to the pin mandrel 234 via a break-away connection defined by a shallow groove 52 at the head/mandrel junction. The fixture pin mandrel 234 is separated from the nutplate assembly by applying a sufficient pulling force to break the head 232 therefrom, as viewed in FIG. 10. During this pulling step, the leading end 48 of the liner sleeve 16 is mechanically deformed or flared, as previously described.

Other features and advantages of the present invention will become more apparent from the following detailed description, taken in conjunction with the accompanying drawings which illustrate, by way of example, the principles of the invention. Accordingly, no limitations on the invention is intended by way of the foregoing description and accompanying drawings, except as set forth in the appended claims.

What is claimed:

1. An attachment assembly for mounting onto a substrate having a front side and blind side and an opening extending therebetween, said attachment assembly comprising:

an attachment having an underside surface for engaging the blind side of the substrate, and attachment including a liner sleeve having a size and shape to protrude through the substrate opening when said attachment underside surface engages the blind side of the substrate; and a fixture pin having a head formed at a trailing end thereof and disposed within said attachment in releasible frictional engagement with said liner sleeve, and a mandrel protruding from said head and terminating at a leading end disposed beyond a leading end of said liner sleeve;

said fixture pin being removable from said attachment by pulling said mandrel from the front side of said substrate, and said leading end of said liner sleeve being deformable to flare said liner sleeve leading end into locked relation with said substrate to mechanically lock said attachment underside surface tightly against the blind side of the substrate.

2. The attachment assembly of claim 1 further including adhesive means for adhesive mounting of said attachment underside surface to the blind side of the substrate.

3. The attachment of claim 1 wherein said attachment comprises a retainer housing having a nut element therein, said retainer housing having said underside surface formed thereon.

4. The attachment assembly of claim 3 wherein said liner sleeve has an outwardly radiating flange formed at a trailing end thereof, said liner sleeve being assembled with said retainer housing and cooperating with a rim formed on said retainer housing to define said underside surface.

5. An attachment assembly for mounting onto a substrate having a front side and blind side and an opening extending therebetween, said attachment assembly comprising:

an attachment having an underside surface for engaging the blind side of the substrate, and attachment including a liner sleeve having a size and shape to protrude through the substrate opening when said attachment underside surface engages the blind side of the substrate; and a fixture pin having a head formed at a trailing end thereof and disposed within said attachment in releasible engagement therewith, and a mandrel protruding from said head and terminating at a leading end disposed beyond a leading end of said liner sleeve;

said fixture pin being removable from said attachment by pulling said mandrel from the front side of said substrate, and said leading end of said liner sleeve being deformable to flare said liner sleeve leading end into locked relation with said substrate to mechanically lock said attachment underside surface tightly against the blind side of the substrate;

said fixture pin head being threadably engaged with said attachment.

6. An attachment assembly for mounting onto a substrate having a front side and blind side and an opening extending therebetween, said attachment assembly comprising:

an attachment having an underside surface for engaging the blind side of the substrate, and attachment including a liner sleeve having a size and shape to protrude through the substrate opening when said attachment underside surface engages the blind side of the substrate; and a fixture pin having a head formed at a trailing end thereof and disposed within said attachment in releasible engagement therewith, and a mandrel protruding from said head and terminating at a leading end disposed beyond a leading end of said liner sleeve;

said fixture pin being removable from said attachment by pulling said mandrel from the front side of said substrate, and said leading end of said liner sleeve being deformable to flare said liner sleeve leading end into locked relation with said substrate to mechanically lock said attachment underside surface tightly against the blind side of the substrate;

said fixture pin head being connected to said mandrel by a region of reduced cross sectional size adapted to cause said fixture pin to break between said head and mandrel when said mandrel is pulled from the front side of the substrate to separate said fixture pin from the liner sleeve.

7. An attachment assembly for mounting onto a substrate having a front side and blind side and an opening extending therebetween, said attachment assembly comprising:

an attachment having an underside surface for engaging the blind side of the substrate, and attachment including a liner sleeve having a size and shape to protrude through the substrate opening when said attachment underside surface engages the blind side of the substrate; and a fixture pin having a head formed at a trailing end thereof and disposed within said attachment in releasible engagement therewith, and a mandrel protruding from said head and terminating at a leading end disposed beyond a leading end of said liner sleeve;

said fixture pin being removable from said attachment by pulling said mandrel from the front side of said substrate, and said leading end of said liner sleeve being deformable to flare said liner sleeve leading end into locked relation with said substrate to mechanically lock said attachment underside surface tightly against the blind side of the substrate; and an installation tool for engaging and pulling said mandrel from the front side of the substrate to separate said fixture pin from the liner sleeve, said installation tool further including means for engaging and flaring said liner sleeve leading end substantially concurrently with said pulling of said mandrel.

8. A nutplate assembly for mounting onto a substrate having a front side and a blind side and an opening extending therebetween, said nutplate assembly comprising:

an open-ended retainer housing defining a radially outwardly extending rim with an underside surface thereon;

a nut element received within said retainer housing;

a liner sleeve having a size and shape to extend through the substrate opening, said liner sleeve having a radially outwardly projecting flange formed at a trailing end thereof, said liner sleeve flange having an underside surface thereon, said liner sleeve flange being assembled with said retainer housing to orient the underside surfaces of said liner sleeve flange and said housing rim in substantially coplanar relation to engage the blind side of the substrate with said liner sleeve projecting through and at least slightly beyond the front side of the substrate; and a fixture pin having a head formed at a trailing end thereof and releasibly frictionally engaging said liner sleeve, said fixture pin further including a mandrel projecting from said head and through said liner sleeve, said mandrel terminating in a leading end exposed at the front side of the substrate;

said fixture pin being removable from said liner sleeve by pulling said mandrel from the front side of the substrate, and said leading end of said liner sleeve being deformable to flare said liner sleeve leading end into locked relation with said substrate.

9. The nutplate assembly of claim 8 wherein said mandrel leading end is disposed at least slightly forward of said liner sleeve leading end.

10. The nutplate assembly of claim 8 further including adhesive means for adhesive mounting of said housing rim to the blind side of the substrate.

11. A nutplate assembly for mounting onto a substrate having a front side and a blind side and an opening extending therebetween, said nutplate assembly comprising:

an open-ended retainer housing defining a radially outwardly extending rim with an underside surface thereon;

a nut element received within said retainer housing;

a liner sleeve having a size and shape to extend through the substrate opening, said liner sleeve having a radially outwardly projecting flange formed at a trailing end thereof, said liner sleeve flange having an underside surface thereon, said liner sleeve flange being assembled with said retainer housing to orient the underside surfaces of said liner sleeve flange and said housing rim in substantially coplanar relation to engage the blind side of the substrate with said liner sleeve projecting through and at least slightly beyond the front side of the substrate; and a fixture pin having a head formed at a trailing end thereof and releasibly engaging at least one of said liner sleeve and said nut element, said fixture pin further including a mandrel projecting from said head and through said liner sleeve, said mandrel terminating in a leading end exposed at the front side of the substrate;

said fixture pin being removable from said liner sleeve by pulling said mandrel from the front side of the substrate, and said leading end of said liner sleeve being deformable to flare said liner sleeve leading end into locked relation with said substrate;

said fixture pin head being threadably engaged with said attachment.

12. A nutplate assembly for mounting onto a substrate having a front side and a blind side and an opening extending therebetween, said nutplate assembly comprising:

an open-ended retainer housing defining a radially outwardly extending rim with an underside surface thereon;

a nut element received within said retainer housing;

a liner sleeve having a size and shape to extend through the substrate opening, said liner sleeve having a radially outwardly projecting flange formed at a trailing end thereof, said liner sleeve flange having an underside surface thereon, said liner sleeve flange being assembled with said retainer housing to orient the underside surfaces of said liner sleeve flange and said housing rim in substantially coplanar relation to engage the blind side of the substrate with said liner sleeve projecting through and at least slightly beyond the front side of the substrate; and a fixture pin having a head formed at a trailing end thereof and releasibly engaging at least one of said liner sleeve and said nut element, said fixture pin further including a mandrel projecting from said head and through said liner sleeve, said mandrel terminating in a leading end exposed at the front side of the substrate;

said fixture pin being removable from said liner sleeve by pulling said mandrel from the front side of the substrate, and said leading end of said liner sleeve being deformable to flare said liner sleeve leading end into locked relation with said substrate;

said fixture pin head being connected to said mandrel by a region of reduced cross sectional size adapted to cause said fixture pin to break between said head and mandrel when said mandrel is pulled from the front side of the substrate to separate said fixture pin from the liner sleeve.

13. A nutplate assembly for mounting onto a substrate having a front side and a blind side and an opening extending therebetween, said nutplate assembly comprising:

an open-ended retainer housing defining a radially outwardly extending rim with an underside surface thereon;

a nut element received within said retainer housing;

a liner sleeve having a size and shape to extend through the substrate opening, said liner sleeve having a radially outwardly projecting flange formed at a trailing end thereof, said liner sleeve flange having an underside surface thereon, said liner sleeve flange being assembled with said retainer housing to orient the underside surfaces of said liner sleeve flange and said housing rim in substantially coplanar relation to engage the blind side of the substrate with said liner sleeve projecting through and at least slightly beyond the front side of the substrate;

a fixture pin having a head formed at a trailing end thereof and releasibly engaging at least one of said liner sleeve and said nut element, said fixture pin further including a mandrel projecting from said head and through said liner sleeve, said mandrel terminating in a leading end exposed at the front side of the substrate;

said fixture pin being removable from said liner sleeve by pulling said mandrel from the front side of the substrate, and said leading end of said liner sleeve being deformable to flare said liner sleeve leading end into locked relation with said substrate; and an installation tool for engaging and pulling said mandrel from the front side of the substrate to separate said fixture pin from the liner sleeve, said installation tool further including means for engaging and flaring said liner sleeve leading end substantially concurrently with said pulling of said mandrel.

* * * * *